(12) United States Patent
Patton

(10) Patent No.: US 11,492,278 B2
(45) Date of Patent: *Nov. 8, 2022

(54) DYNAMIC PRODUCED WATER TREATMENT APPARATUS AND SYSTEM

(71) Applicant: HYDROZONIX, LLC, Conroe, TX (US)

(72) Inventor: Mark Patton, Conroe, TX (US)

(*) Notice: Subject to any disclaimer, the term of this patent is extended or adjusted under 35 U.S.C. 154(b) by 88 days.

This patent is subject to a terminal disclaimer.

(21) Appl. No.: 16/701,210

(22) Filed: Dec. 3, 2019

(65) Prior Publication Data

US 2020/0102234 A1    Apr. 2, 2020

Related U.S. Application Data

(63) Continuation of application No. 16/246,646, filed on Jan. 14, 2019, and a continuation of application No. PCT/US2019/013431, filed on Jan. 14, 2019.
(Continued)

(51) Int. Cl.
*C02F 1/00* (2006.01)
*C02F 1/24* (2006.01)
(Continued)

(52) U.S. Cl.
CPC .............. *C02F 1/78* (2013.01); *C02F 1/00* (2013.01); *C02F 1/24* (2013.01); *C02F 1/40* (2013.01);
(Continued)

(58) Field of Classification Search
CPC ...... C02F 1/00; C02F 1/24; C02F 1/40; C02F 1/78; C02F 2101/101; C02F 2101/32;
(Continued)

(56) References Cited

U.S. PATENT DOCUMENTS 5,527,465 A * 6/1996 Dickerson ............... C02F 1/78
                                                                    210/620
5,958,240 A    11/1999 Hoel
(Continued)

OTHER PUBLICATIONS

PCT International Search Report and Written Opinion, PCT/US2019/013431, Applicant HYDROZONIX LLC, filed Jan. 14, 2019.

*Primary Examiner* — Lucas A Stelling
(74) *Attorney, Agent, or Firm* — Wayne Edward Ramage; Baker Donelson

(57) ABSTRACT

An automated produced water treatment system that injects ozone or an ozone-oxygen mixture upstream of produced water separators, with the dose rate changing dynamically as the produced water quality changes, as determined by continuous monitoring of the produced water quality by a plurality of sensors that detect water quality parameters in real time. The system may operate as a "slipstream" injection system, that draws a portion of produced water from the produced water pipeline and injects ozone or an ozone-oxygen mixture back into the pipeline with disrupting or slowing normal operations. Disinfectants or other additives may also be injected. The treatment system may be wholly or partially contained in mobile containers or trailers, for on-the-fly use in existing produced water treatment facilities.

10 Claims, 18 Drawing Sheets

Related U.S. Application Data

(60) Provisional application No. 62/749,150, filed on Oct. 23, 2018, provisional application No. 62/731,748, filed on Sep. 14, 2018, provisional application No. 62/617,258, filed on Jan. 14, 2018.

(51) Int. Cl.

| | | |
|---|---|---|
| *C02F 1/40* | (2006.01) | |
| *C02F 1/78* | (2006.01) | |
| *E21B 43/26* | (2006.01) | |
| *E21B 43/40* | (2006.01) | |
| *C02F 103/10* | (2006.01) | |
| *C02F 101/32* | (2006.01) | |
| *C02F 101/10* | (2006.01) | |
| *C02F 103/36* | (2006.01) | |

(52) U.S. Cl.
CPC ........ *E21B 43/40* (2013.01); *C02F 2101/101* (2013.01); *C02F 2101/32* (2013.01); *C02F 2103/10* (2013.01); *C02F 2103/365* (2013.01); *C02F 2201/007* (2013.01); *C02F 2201/008* (2013.01); *C02F 2201/784* (2013.01); *C02F 2209/001* (2013.01); *C02F 2209/006* (2013.01); *C02F 2209/008* (2013.01); *C02F 2303/04* (2013.01); *C02F 2303/26* (2013.01); *E21B 43/26* (2013.01)

(58) Field of Classification Search
CPC ............ C02F 2103/10; C02F 2103/365; C02F 2201/007; C02F 2201/008; C02F 2201/784; C02F 2209/001; C02F 2209/006; C02F 2209/008; C02F 2303/04; C02F 2303/26; E21B 43/26; E21B 43/40
See application file for complete search history.

(56) References Cited

U.S. PATENT DOCUMENTS

| | | |
|---|---|---|
| 9,315,403 B1 | 4/2016 | Laur et al. |
| 2005/0249631 A1* | 11/2005 | Schulz ............. A61L 2/202 422/28 |
| 2006/0243344 A1 | 11/2006 | Nilsen |
| 2009/0107917 A1 | 4/2009 | Capehart |
| 2009/0152209 A1 | 6/2009 | Agrawal |
| 2011/0186526 A1 | 8/2011 | Mcguire et al. |
| 2012/0080374 A1* | 4/2012 | Komor ............. C02F 3/286 210/603 |
| 2012/0125851 A1* | 5/2012 | Shapiro ............. C02F 9/005 210/652 |
| 2013/0229889 A1 | 9/2013 | Osborn et al. |
| 2013/0313191 A1 | 11/2013 | Wolf et al. |
| 2016/0060149 A1 | 3/2016 | Scott et al. |
| 2016/0221842 A1 | 8/2016 | Rau, III |
| 2018/0319685 A1* | 11/2018 | Ball ................. C02F 1/72 |

\* cited by examiner

DYNAMIC PRODUCED WATER TREATMENT APPARATUS AND SYSTEM

This application is a continuation of U.S. patent application Ser. No. 16/246,646, filed Jan. 14, 2019, and a continuation of PCT Patent Application No. PCT/US19/13431, filed Jan. 14, 2019, both of which claim benefit of and priority to U.S. Provisional Applications No. 62/749,150, filed Oct. 23, 2018, No. 62/731,748, filed Sep. 14, 2018, and No. 62/617,258, filed Jan. 14, 2018. U.S. patent application Ser. No. 16/246,646, PCT Patent Application No. PCT/US19/13431, and U.S. Provisional Applications Nos. 62/749,150, 62/731,748, and 62/617,258 are incorporated herein in their entireties by specific reference for all purposes.

FIELD OF INVENTION

This invention relates to an apparatus and system for automatically and dynamically treated produced water from oil and gas production operations.

BACKGROUND OF THE INVENTION

A variety of oil and gas operations generate large volumes of water mixed with hydrocarbons and various contaminants, generally referred to in the industry as "produced water." Most produced water is contaminated with inorganic salts, metals, organic compounds, and other materials, such as emulsifiers or other agents that may be injected for various types of enhanced recovery operations. Typical hydrocarbons in produced water include semivolatile organic compounds ("SVOCs") and volatile organic compounds ("VOCs"). In most operations, produced water is treated by a variety of means to separate hydrocarbons from the fluid stream, and remove or treat contaminants before ultimate disposal. Examples of systems and methods for treating produced water are described in Sullivan, et al., US 2009/0101572, Ikebe, et al., US 2010/0264068, and Folkvang, US 2014/0346118, all of which are incorporated herein in their entireties by specific reference for all purposes.

SUMMARY OF THE INVENTION

In various exemplary embodiments, the present invention comprises an automated treatment system that injects ozone or an ozone-oxygen mixture upstream of the separators, with the dose rate changing dynamically as the produced water quality changes (as determined by continuous monitoring of the produced water quality by a plurality of sensors that detect water quality parameters in real time). In several embodiments, the system may operate as a "slipstream" injection system, that draws a portion of produced water from the produced water pipeline and injects ozone or an ozone-oxygen mixture back into the pipeline with disrupting or slowing normal operations. Disinfectants or other additives may also be injected. The ozone is consumed rapidly by bacteria, iron, sulfides and other reducers in the produced water stream, while the oxygen bubbles in the produced water provides an Induced Gas Flotation (IGF) effect in the downstream separators. The IGF effect clarifies the water by removing suspended matter in the produced water, such as oil or solids. The oxygen bubbles provide lift, floats lighter solids, and improves the oil/water separation process.

In the ozone generation process, oxygen is separated from ambient air, with the remaining "reject gas" typically vented to the atmosphere in prior art operations. In the present process, the reject gas instead is directed to the separation tanks, where it is used as a blanket gas in the tanks. The reject gas comprises mostly nitrogen and thus is inert, and is used as a gas phase maintained above the liquid (i.e., produced water) in the separation tanks or other vessels to protect the liquid from air contamination and to reduce the hazard of explosion or fire.

Some or all of the reject gas (i.e., in conjunction with, or as an alternative to, the use of the reject gas as a blanket gas) may also be injected into the produced water or fluid stream using a nano-bubble diffuser prior to disposal in an injection well. The nano-bubble diffuser introduces the inert gas (mostly nitrogen) into the produced water in the form of micro- or nano-bubbles, which provide friction reduction in the fluid, and reduces the injection/disposal well pump pressure.

Various combined systems may introduce ozone/oxygen just prior to injection for "on-the-fly" disinfection and treatment, while also providing friction reduction benefits, in combination with a secondary system that introduces nitrogen or nitrogen-rich gas in the form of micro- and/or nano-bubbles (through nano-bubble diffusers) to increase or optimize friction reduction. The nitrogen nano-bubble delivery system also may be used independently as an "on-the-fly" stand-alone friction reduction system. A nitrogen concentrator also may be used to add nitrogen or increase the nitrogen concentration in a gas prior to forming the bubbles.

DETAILED DESCRIPTION OF EXEMPLARY EMBODIMENTS

Figure 1:
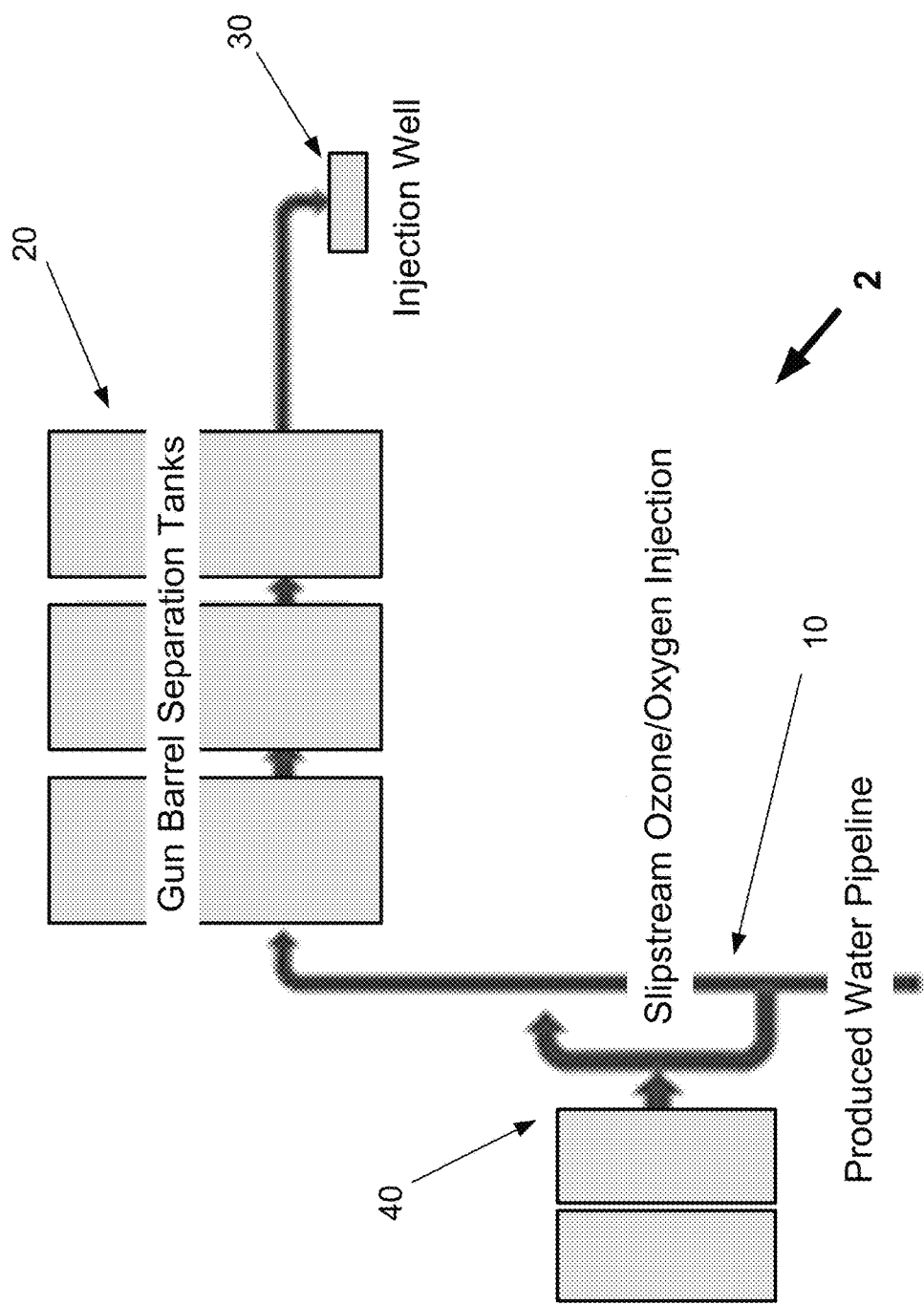
FIG. 1 shows a diagram of an exemplary embodiment of the present invention.

Produced water originates at the wellhead, and then typically travels via pipeline 10 to tank batteries, where held for a gathering system for processing and treatment. In general, oil or other hydrocarbons are separated and collected, and the remaining wastewater is directed to an injection or disposal well 30. One of the most common oil/water separation systems use one or more "gun barrel" separation tanks 20, as seen in FIG. 1.

As the produced water travels from the wellhead and through the gathering system, it is subjected to various treatments or processes. For example, the produced water receives injections of chemicals at or near the well head, either in batch or continuous treatments. As the produced water slows down in the gun barrel separators 20, bacteria can accumulate and hydrogen sulfide can form. To counter this, biocidal agents typically are added upstream of the gun barrel separators. Chemical biocides generally are added at a predetermined, constant dose rate, but as produced water quality changes, this constant dose rate becomes ineffective.

In several embodiments, the present invention comprises an automated treatment system 2 that injects ozone or an ozone-oxygen mixture 40 upstream of the separators, with the dose rate changing dynamically as the produced water quality changes (as determined by continuous monitoring of the produced water quality). While ozone-oxygen may be added directly, in a preferred embodiment, as seen in FIG. 1, the system may operate as a "slipstream" injection system 40, that draws a portion of produced water from the produced water pipeline 10 and injects ozone or an ozone-oxygen mixture into this drawn-off portion, which is then introduced back into the main produced water pipeline 10 without disrupting or slowing normal operations. Disinfectants or other additives may also be injected into the drawn-off portion (or directly into the main produced water pipeline).

The ozone is consumed rapidly by bacteria, iron, sulfides and other reducers in the produced water stream, while the oxygen bubbles in the produced water provides an Induced Gas Flotation (IGF) effect in the downstream separators. The IGF effect clarifies the water by removing suspended matter in the produced water, such as oil or solids. The oxygen bubbles adhere to suspended matter, provide lift, floats lighter solids to the surface of the water, and improves the oil/water separation process.

Figure 2:
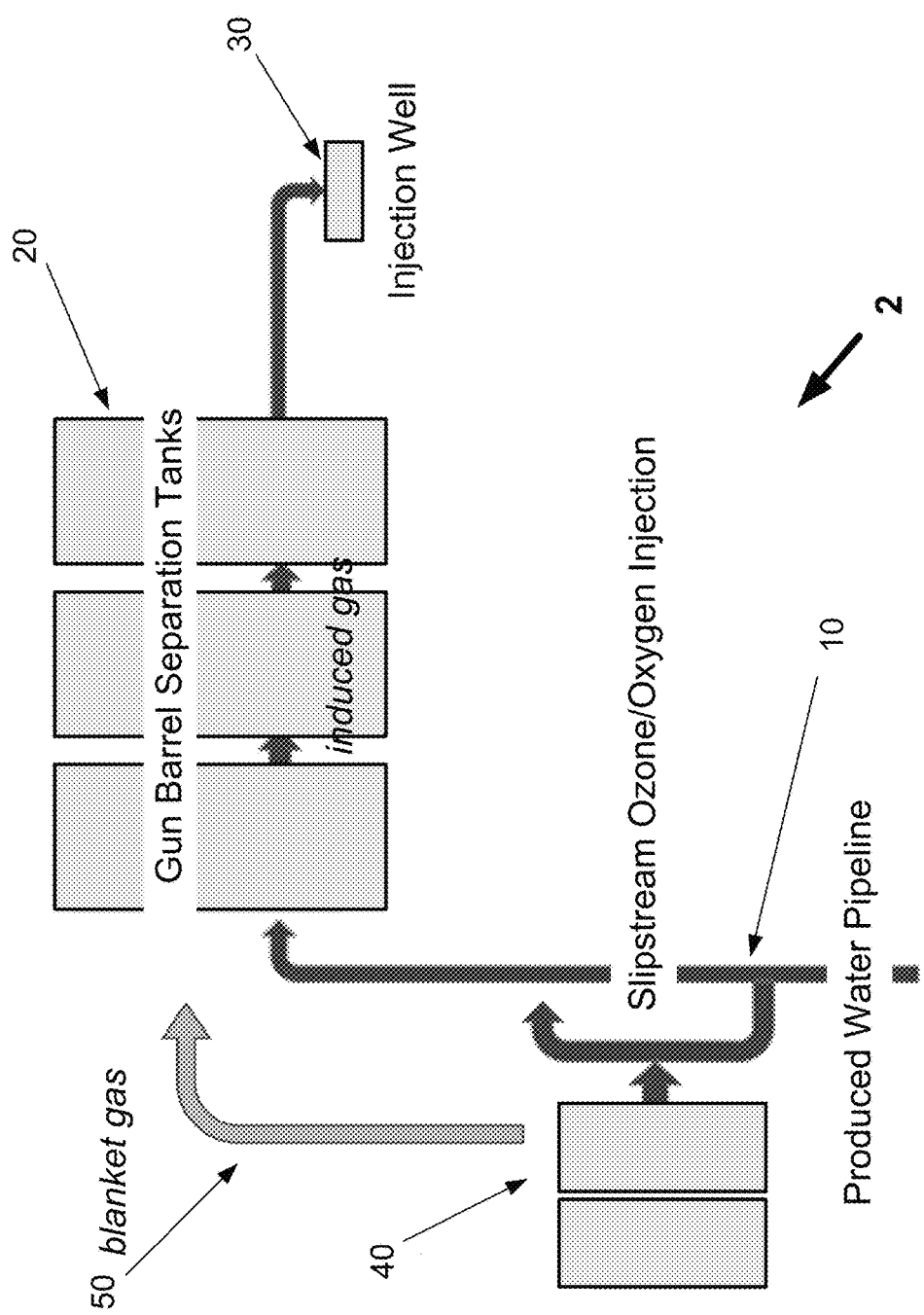
FIG. 2 shows a diagram of another exemplary embodiment of the present invention.

In the ozone generation process, oxygen is separated from ambient air, with the remaining "reject gas" (i.e., the oxygen-depleted ambient air left after separation) typically vented to the atmosphere in prior art operations. In several embodiments of the present process, this reject gas instead is directed to the separation tank(s) 20, where it is used as a blanket gas 50 in the tanks, as seen in FIG. 2. This reject gas comprises mostly nitrogen and thus is inert, and is used as a gas phase maintained above the liquid (i.e., the produced water being treated) in the separation tanks or other vessels to protect the liquid from air contamination and to reduce the hazard of explosion or fire.

Figure 3:
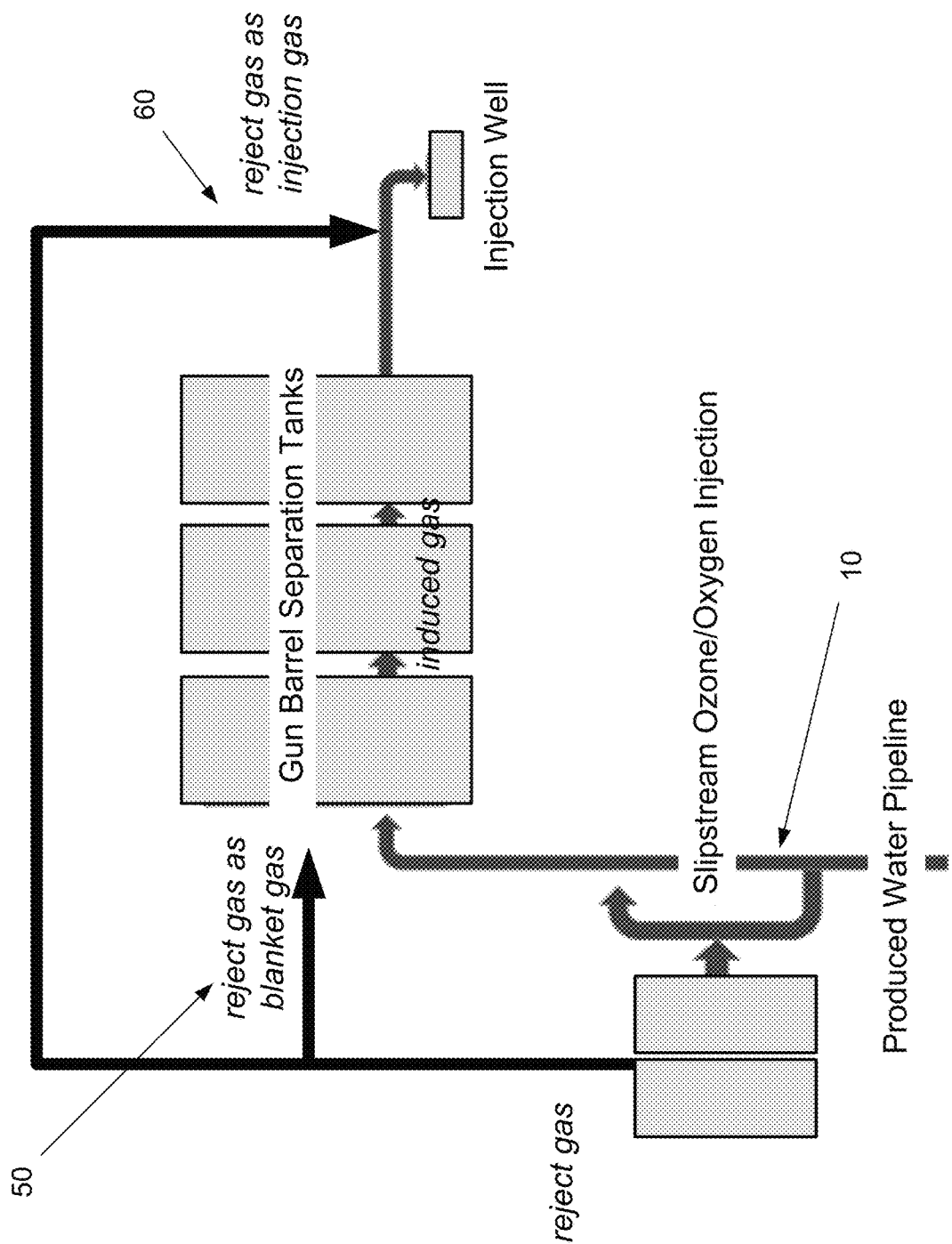
FIG. 3 shows a diagram of another embodiment of the present invention with reject gas injection.
Figure 4:
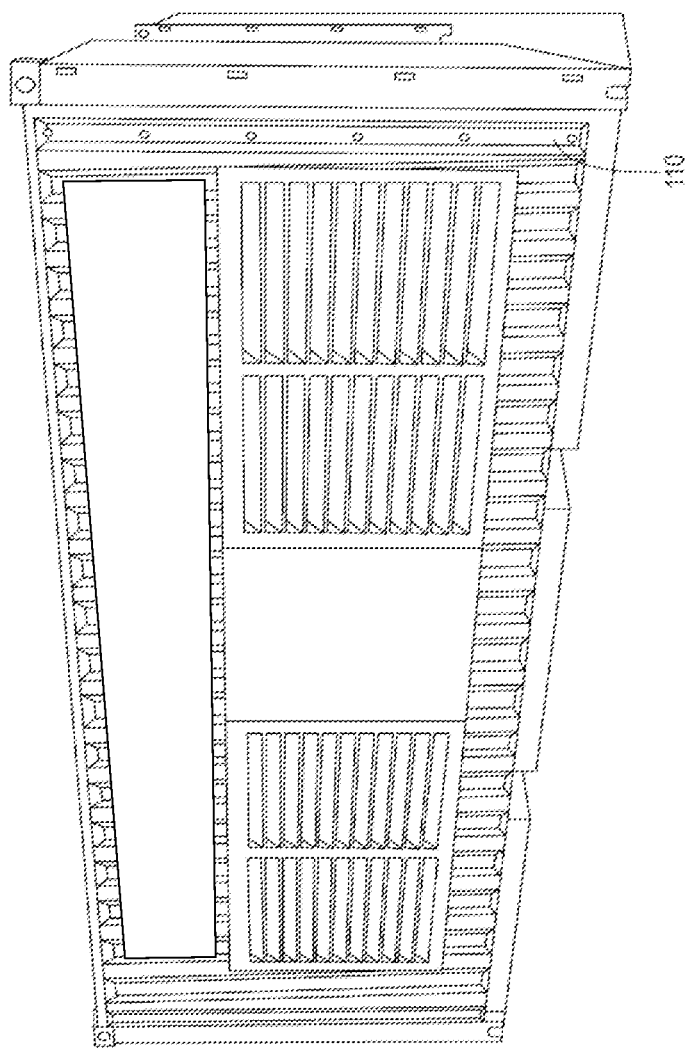
FIGS. 4-10 show exterior and interior views of single and dual unit embodiments of the present invention.
Figure 5:
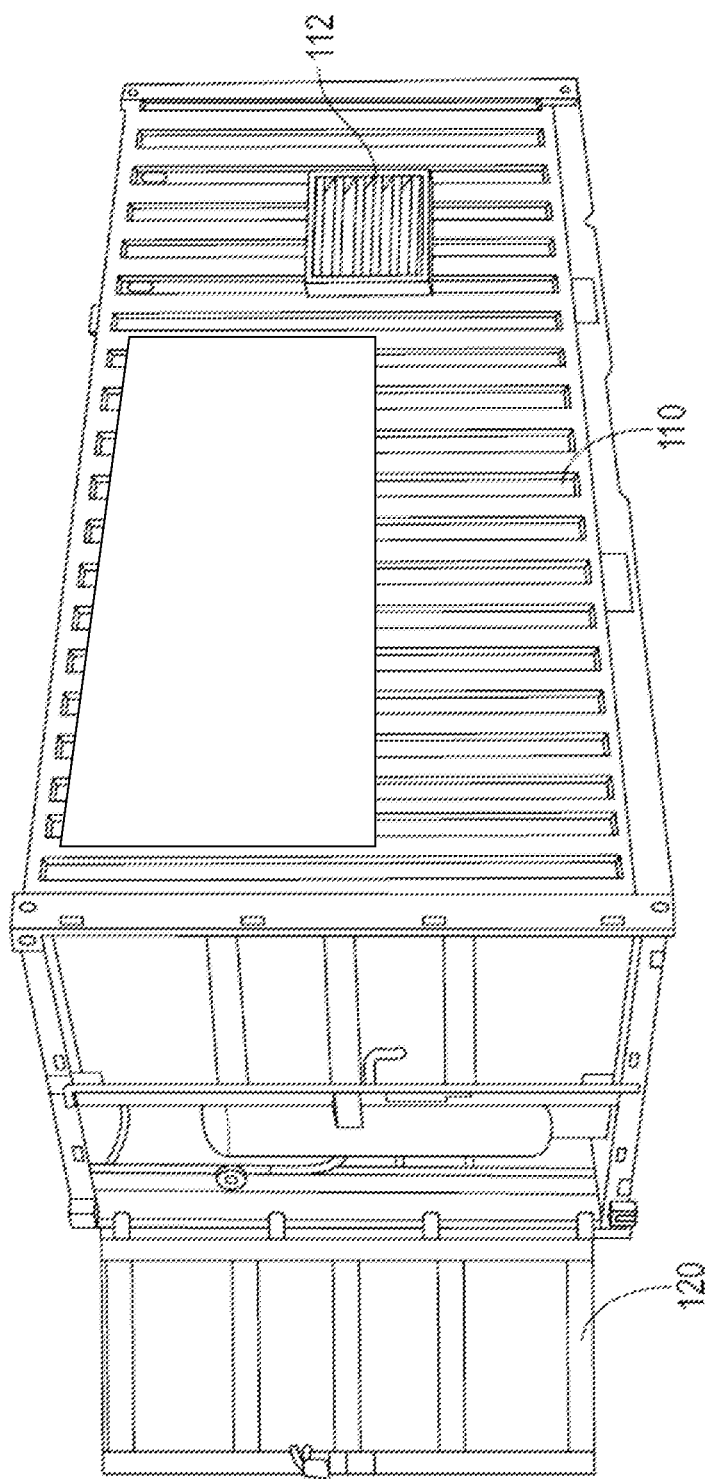
Figure 6:
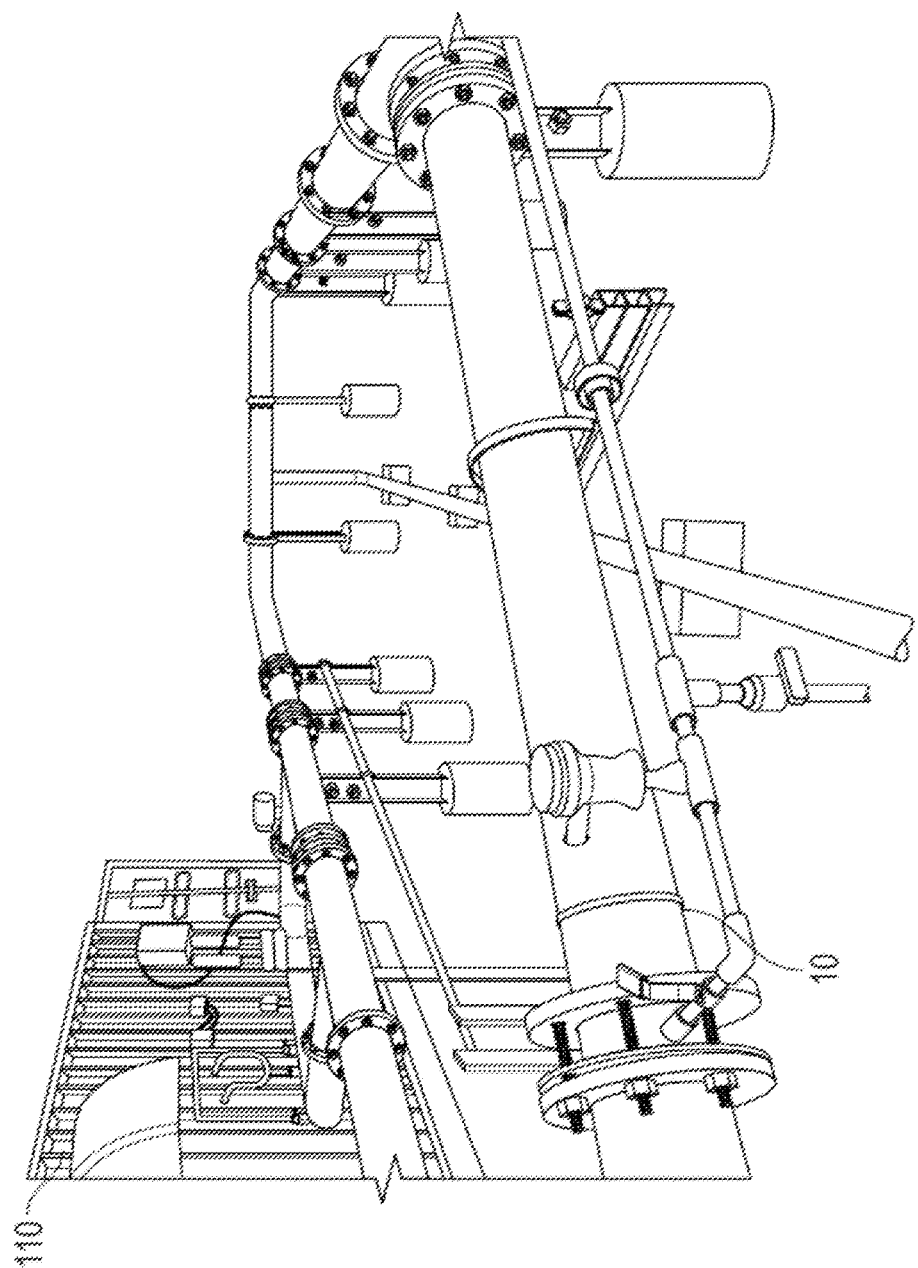
Figure 7:
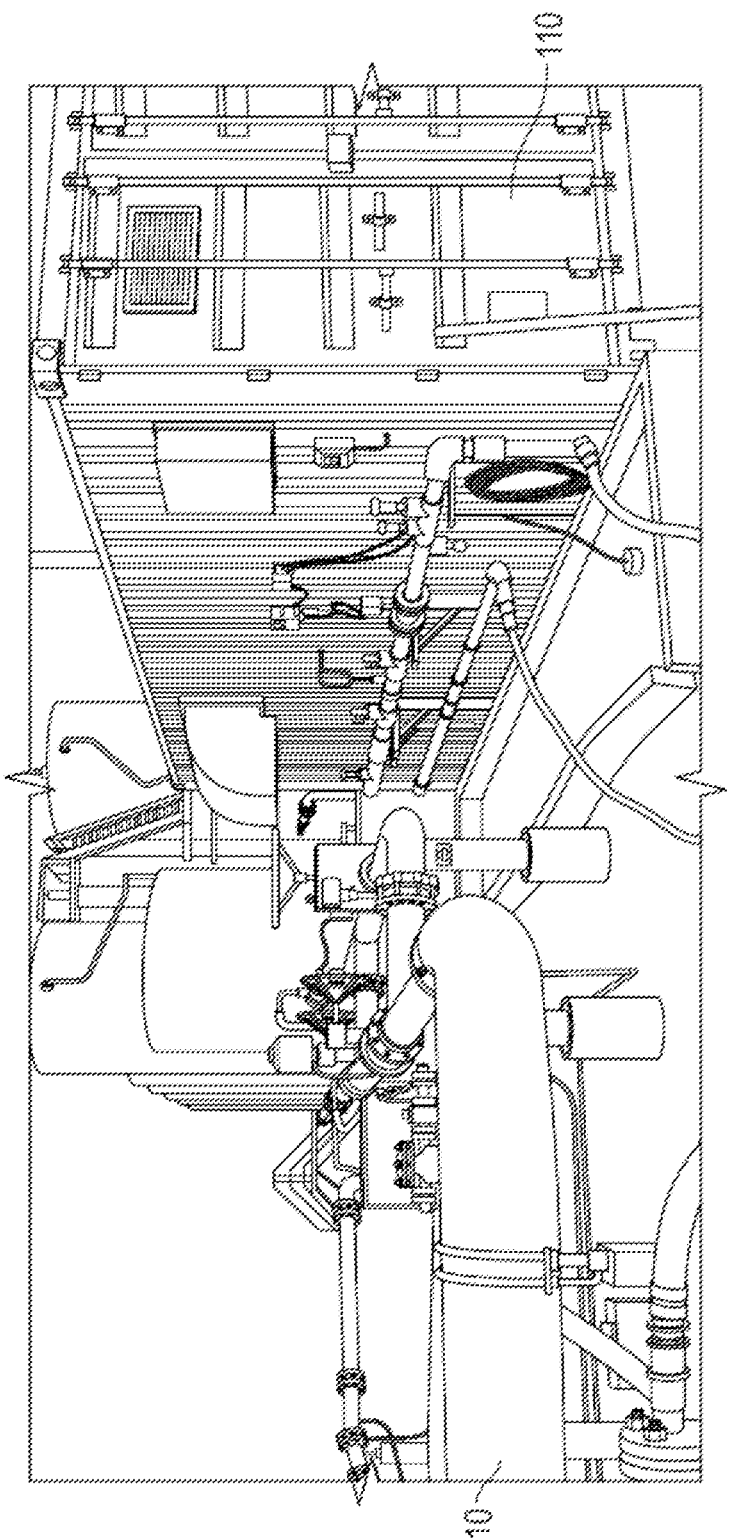

In yet a further embodiment, as seen in FIG. 3, some or all of the reject gas (i.e., in conjunction with, or as an alternative to, the use of the reject gas as a blanket gas 50) may also be injected 60 into the produced water or fluid stream using a nano-bubble diffuser prior to disposal in the injection well 30. The nano-bubble diffuser introduces the inert gas (mostly nitrogen) into the produced water in the form of micro- or nano-bubbles, which provide friction reduction in the fluid being injected into the injection/disposal well, and reduces the injection/disposal well pump pressure.

While the system may be a permanently installed component of a produced water treatment facility, in various alternative embodiments, as seen in FIGS. 4-10, the system is contained in one or more portable, movable containers or trailers 110 with ventilation 112, such as a modified shipping container or wheeled trailer. One or more doors 120 allow user access to the interior, which contains the components of the system.

Figure 11:
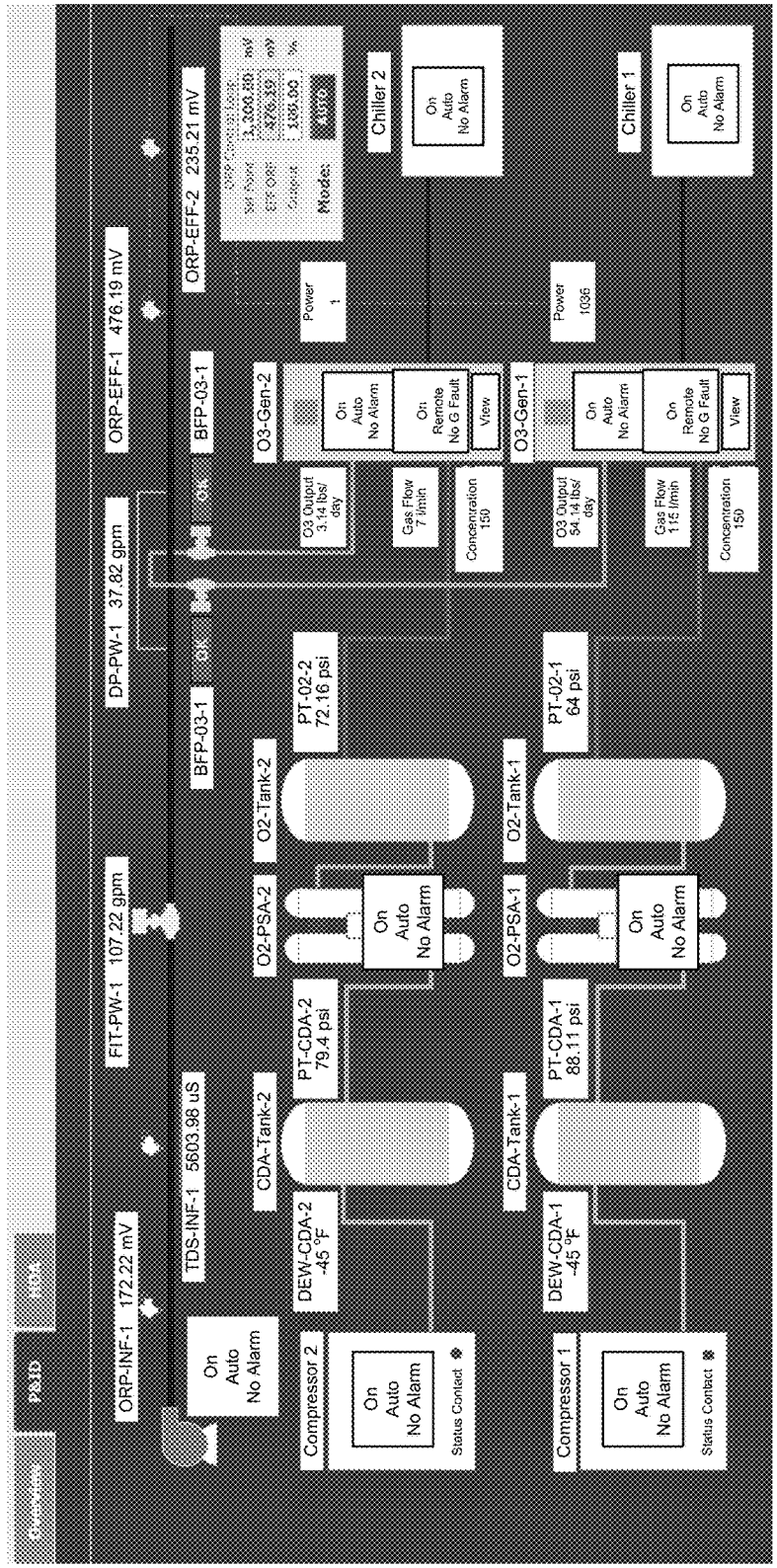
FIG. 11 shows an example of a system status display screen.

The container/trailer 110 is moved to a desired location next to a section of the produced water pipeline, and fluid connection is made. The present system can thus be easily retro-fitted to existing produced water treatment facilities, removed when operations are terminated, or moved from location to location as needed. The system is fully automatic once installed, monitoring water quality and adjusting disinfectant and oxidation dosages automatically as water quality changes, and can be monitored and operated remotely, using a remote computer or mobile computing device (e.g., cell phone, tablet) (an example of a system monitoring display 122 is shown in FIG. 11).

Figure 8:
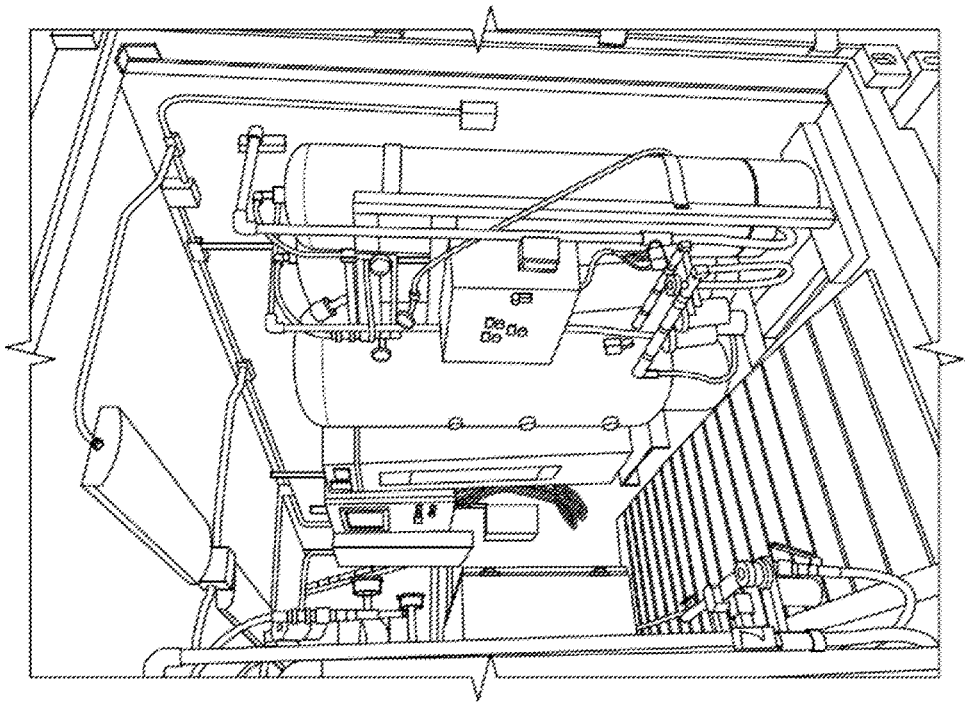
Figure 8:
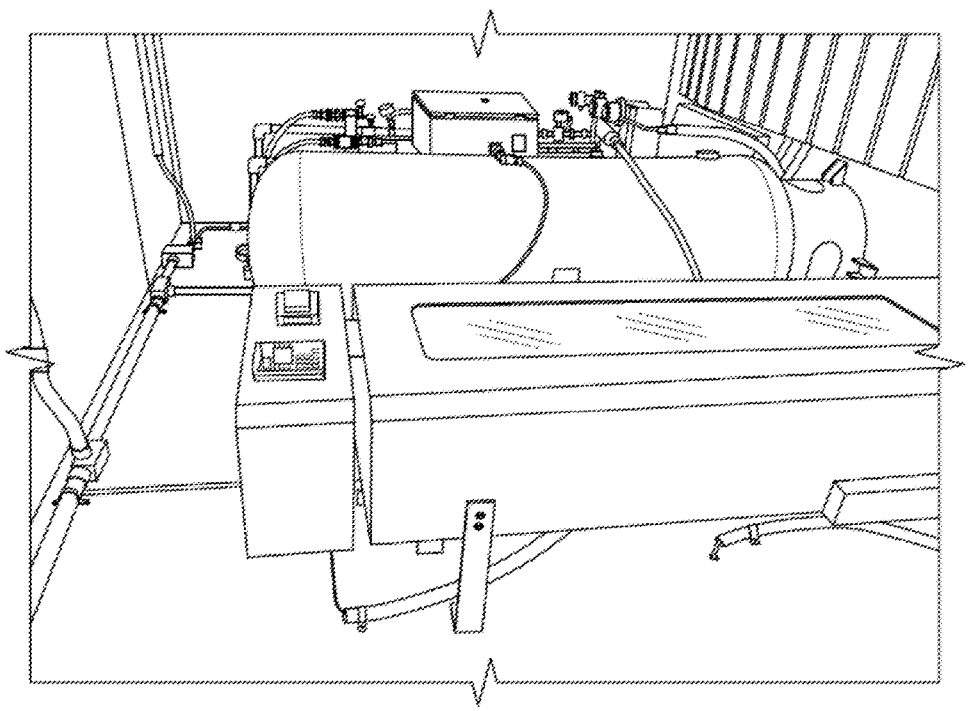
Figure 9:
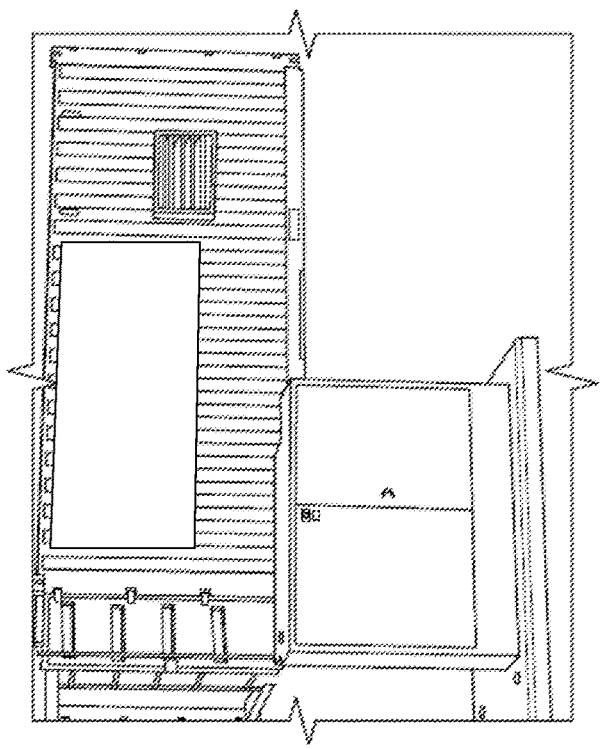
Figure 9:
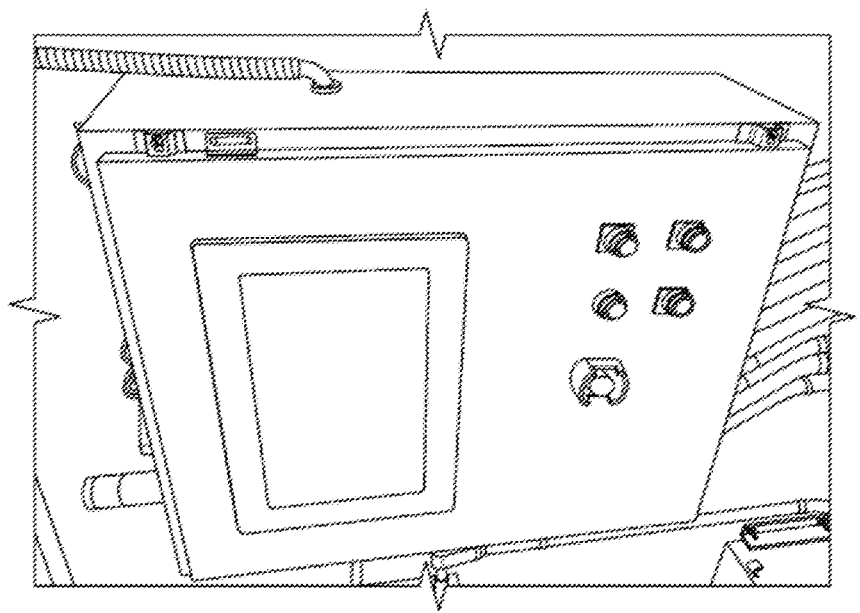
Figure 10:
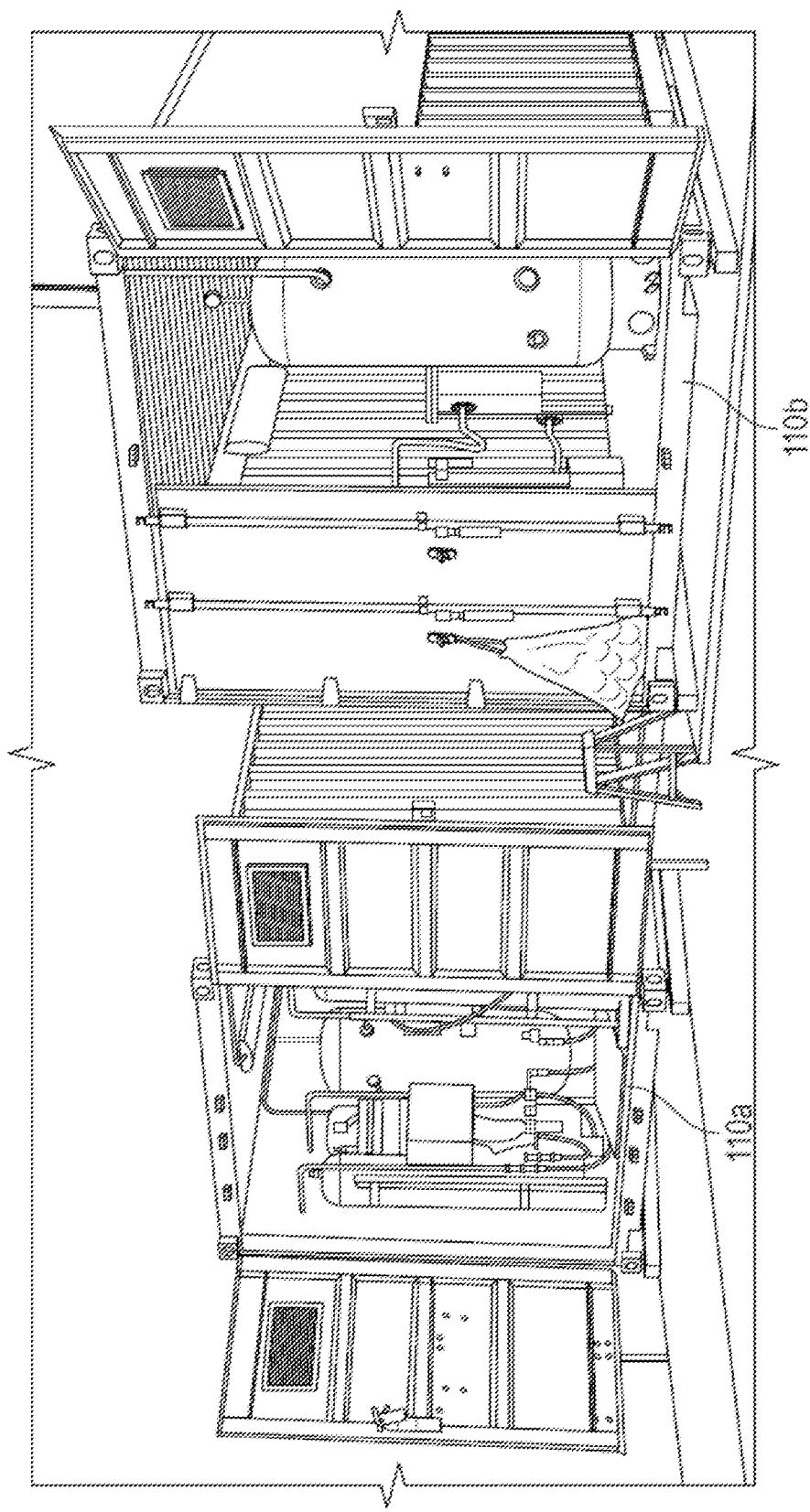
Figure 12:
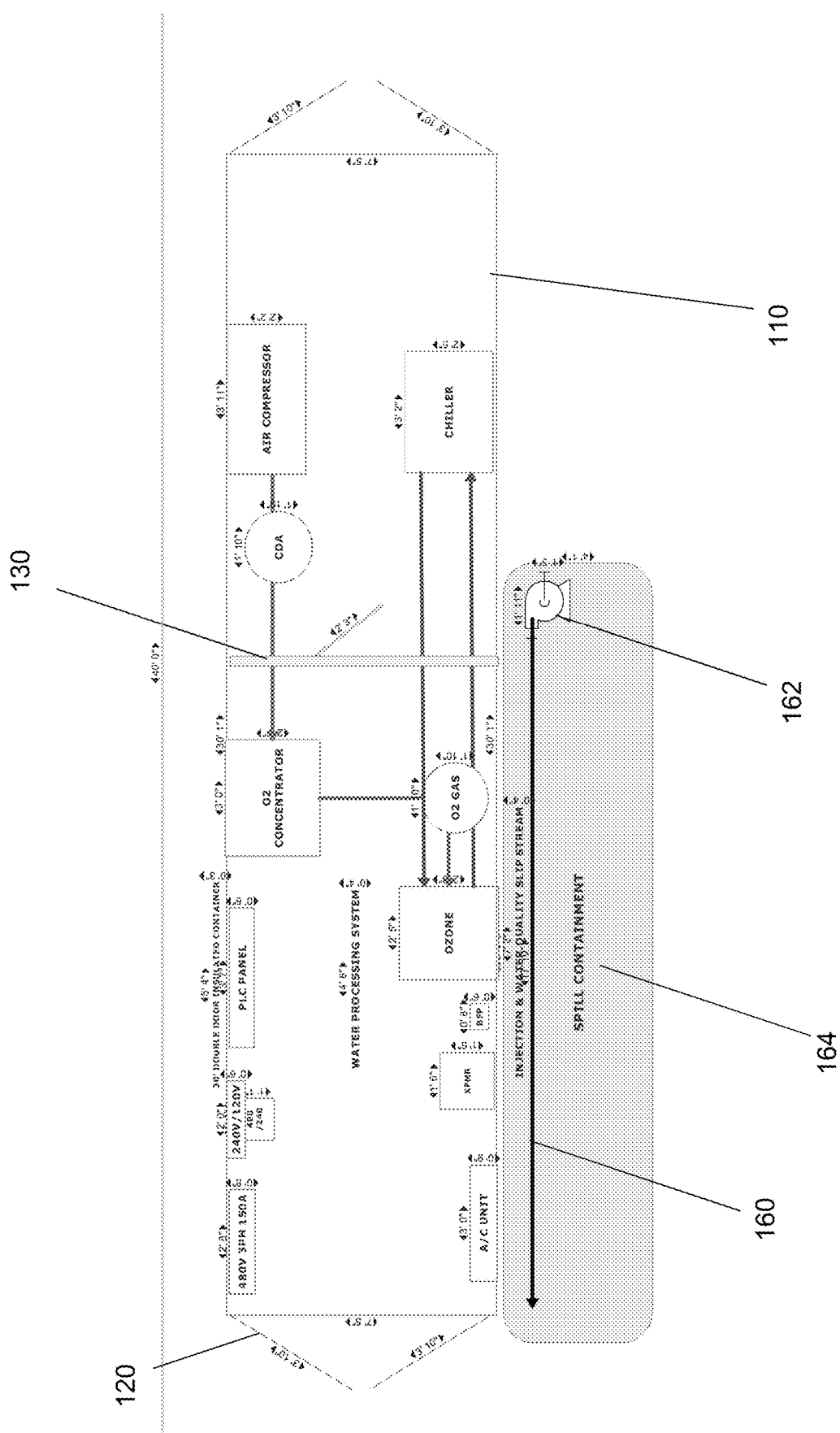
FIG. 12 shows a top view of a single unit embodiment of the present system.

FIG. 12 shows a top view of a schematic diagram of an exemplary insulated container 110 30 feet long and 7.5 feet wide with double doors 110 at one or both ends. The air/water handling system (e.g., air compressor, chiller, CDA) and water processing systems (O2 concentrator, O2 tank, ozone tank, injection system) are both contained in the same unit, and may be separated by an insulated panel 130 which also may have a door. The system in this configuration has a processing capacity of 15,000 BPD (barrels per day). The interior comprises power supply connections, programmable logic controller (PLC), air compressor, compressed/clean dry air package, oxygen concentrator, oxygen gas tank, chilling unit, ozone generator, air conditioning unit, transformer, quality testing unit, and fluid connections and pumps (as also seen in FIGS. 8-10). On one side of the unit is the injection and water quality "slipstream" piping 160 with pump(s) 162, which may be contained in or suspended above a spill containment tank, pool, or pit. Some of the slipstream piping may or may not enter the interior of the unit, although as shown, the slipstream piping is outside and adjacent thereto.

Figure 13:
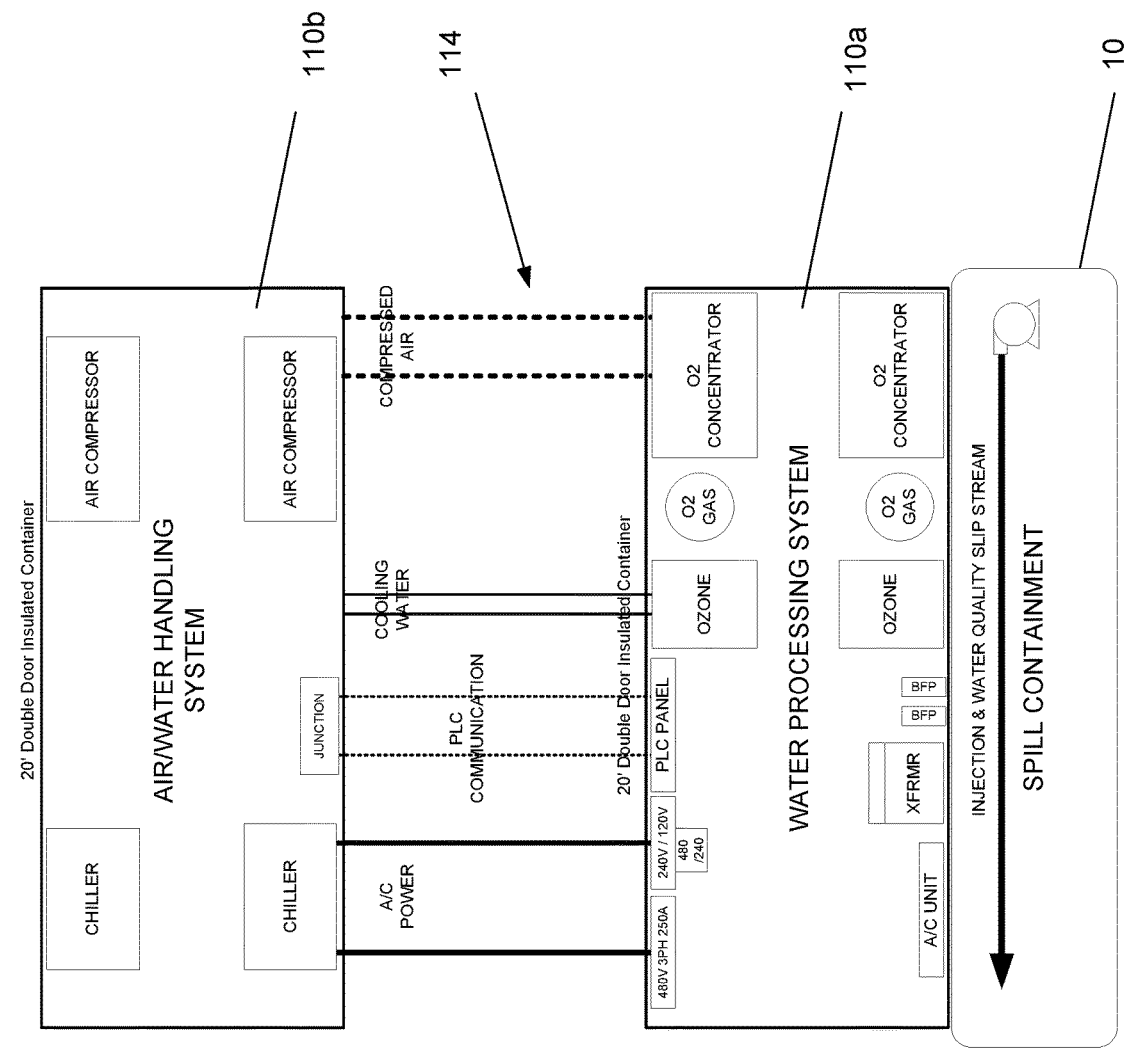
FIGS. 13-15 show top views of a dual unit embodiment of the present system.
Figure 14:
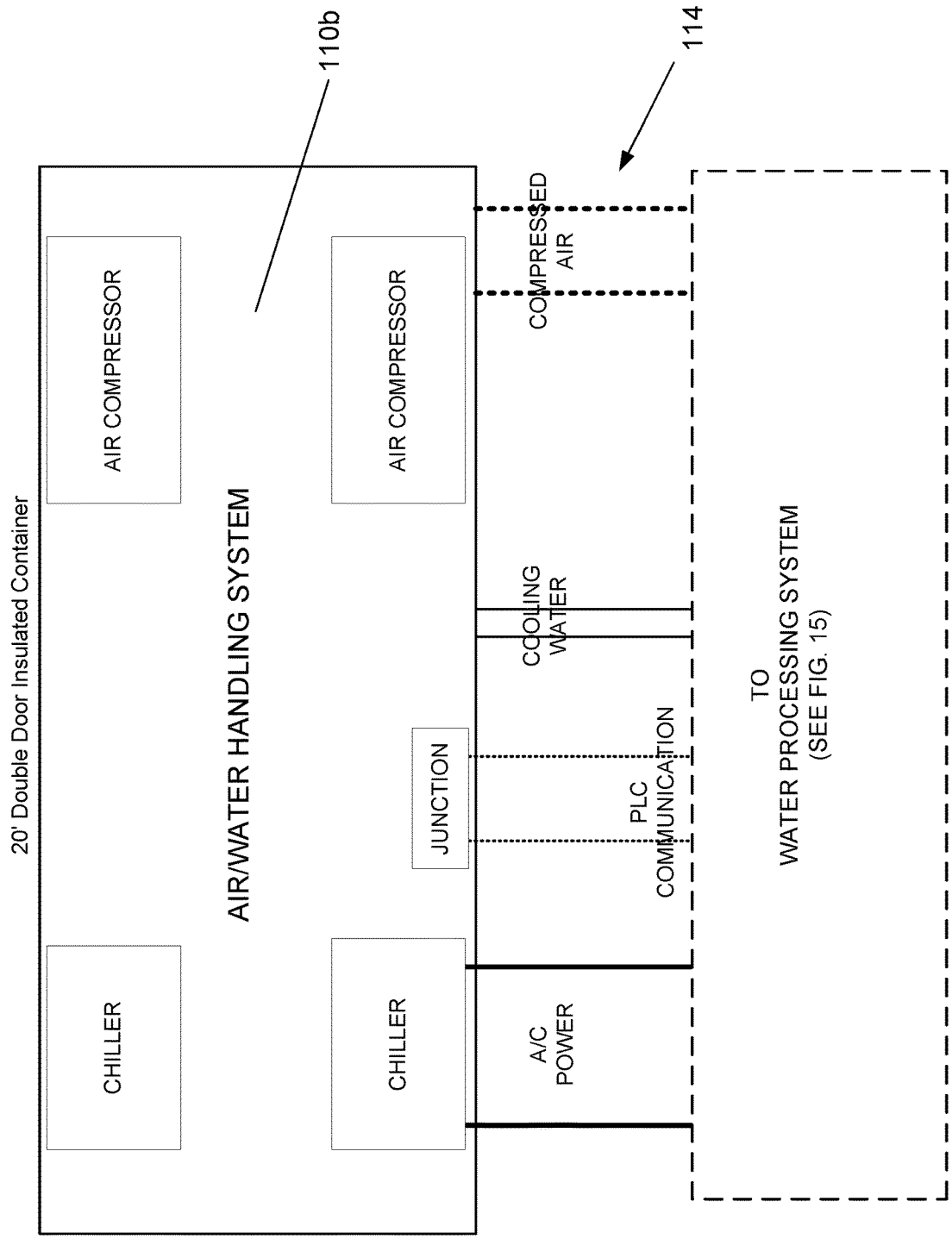
Figure 15:
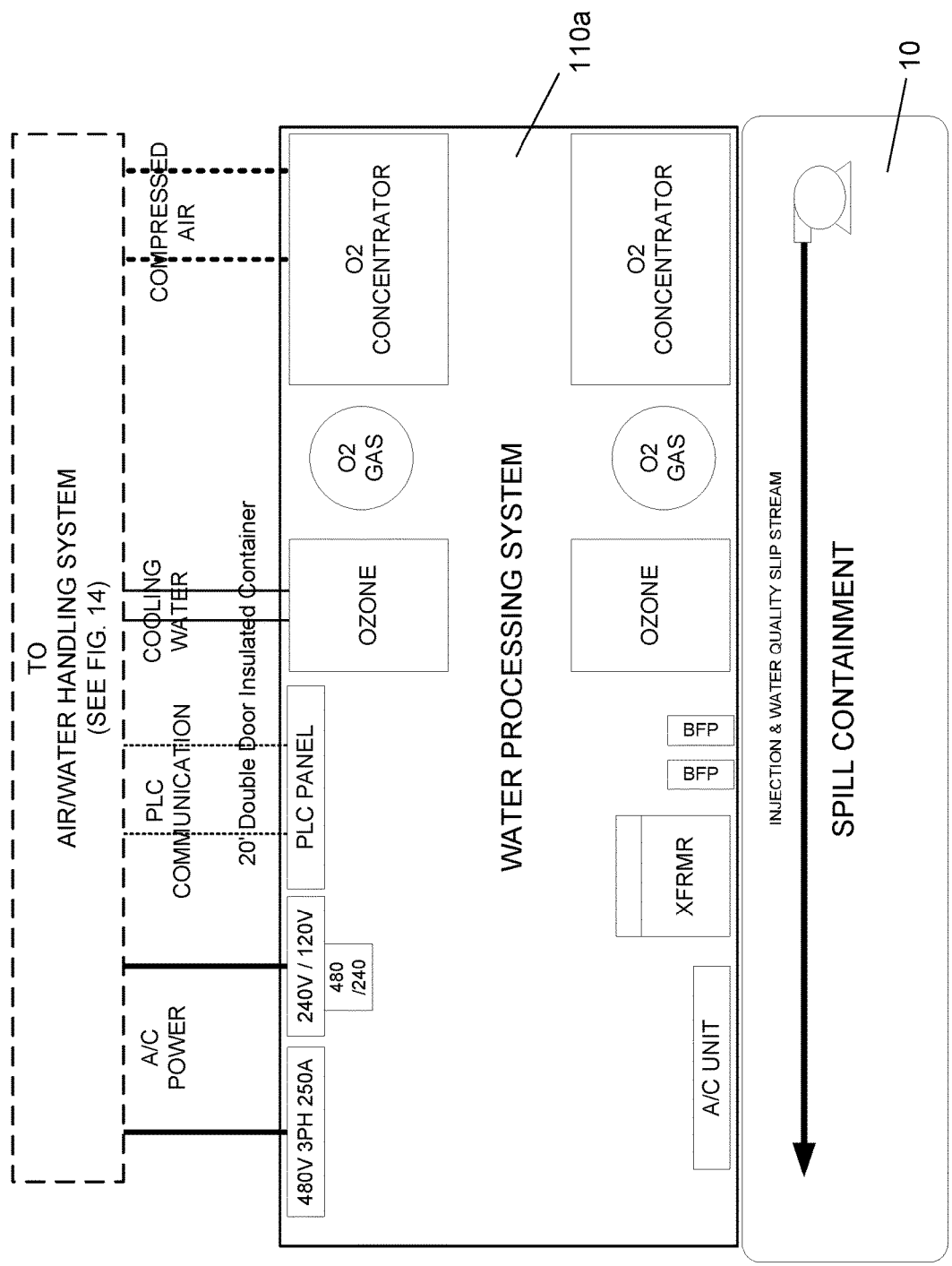

FIGS. 13-15 shows a top view of dual container units 110a, 110b (FIG. 13 shows a view of both units, FIG. 14 shows a close-up view of the "remote" air/water handling system unit not directly connected to the slipstream piping, and FIG. 15 shows a close-up view of the water processing unit with the slipstream piping), each 20 feet long, with a processing capacity of 30,000 BPD. Several system components are doubled (e.g., two chillers, two air compressors, two ozone tanks, two 02 concentrators, and so on) for greater capacity, and the air/water handling system and water processing system are separately installed in respective container units as shown. Piping and conduits 114 extend between the units (e.g., A/C power conduits/cables, PLC communication conduits/cables, cooling water pipes, compressed air pipes).

While the figures show a side-by-side dual configuration, other configurations with two or more container units are possible, and are within the scope of this invention. The container units may be of various sizes, and the components therein may vary in placement and size from the figures.

In several embodiment, combined systems may be used to introduce ozone/oxygen (as described above) prior to or just prior to injection for "on-the-fly" disinfection and treatment, while also providing friction reduction benefits, in combination with a secondary nitrogen nano-bubble system that introduces nitrogen or nitrogen-rich gas in the form of micro- and/or nano-bubbles (through nano-bubble diffusers) to increase or optimize friction reduction. The nitrogen nano-bubble deliver system may be contained in a container (s) or trailer(s) in the same manner as described above for oxygen/ozone systems. The nitrogen nano-bubble delivery system also may be used independently (i.e., without the ozone/oxygen system) as an "on-the-fly" stand-alone friction reduction system. A nitrogen concentrator also may be used to add nitrogen or increase the nitrogen concentration in a gas prior to forming the bubbles.

Figure 16:
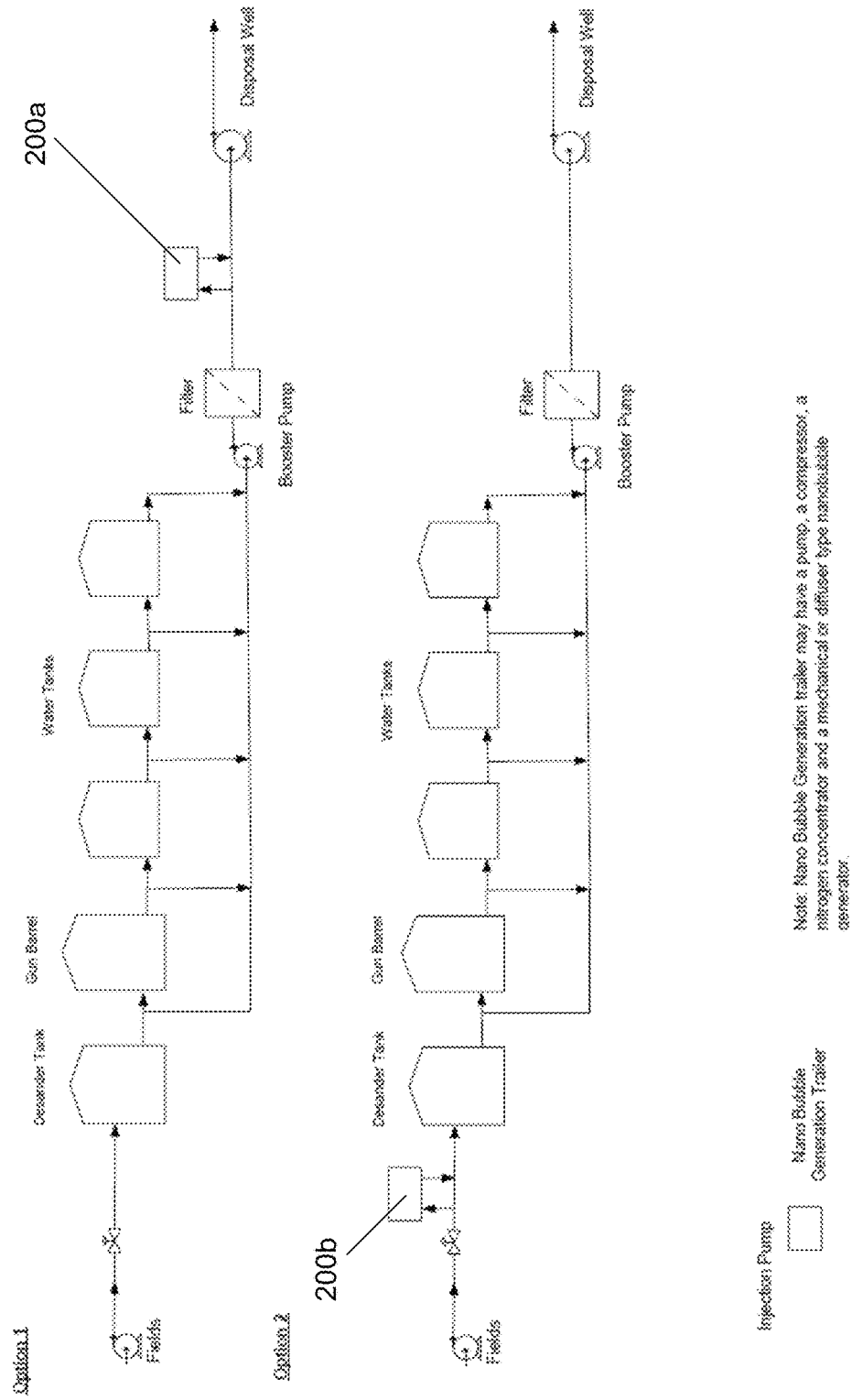
FIGS. 16-18 show examples of combined systems with friction reduction.
Figure 17:
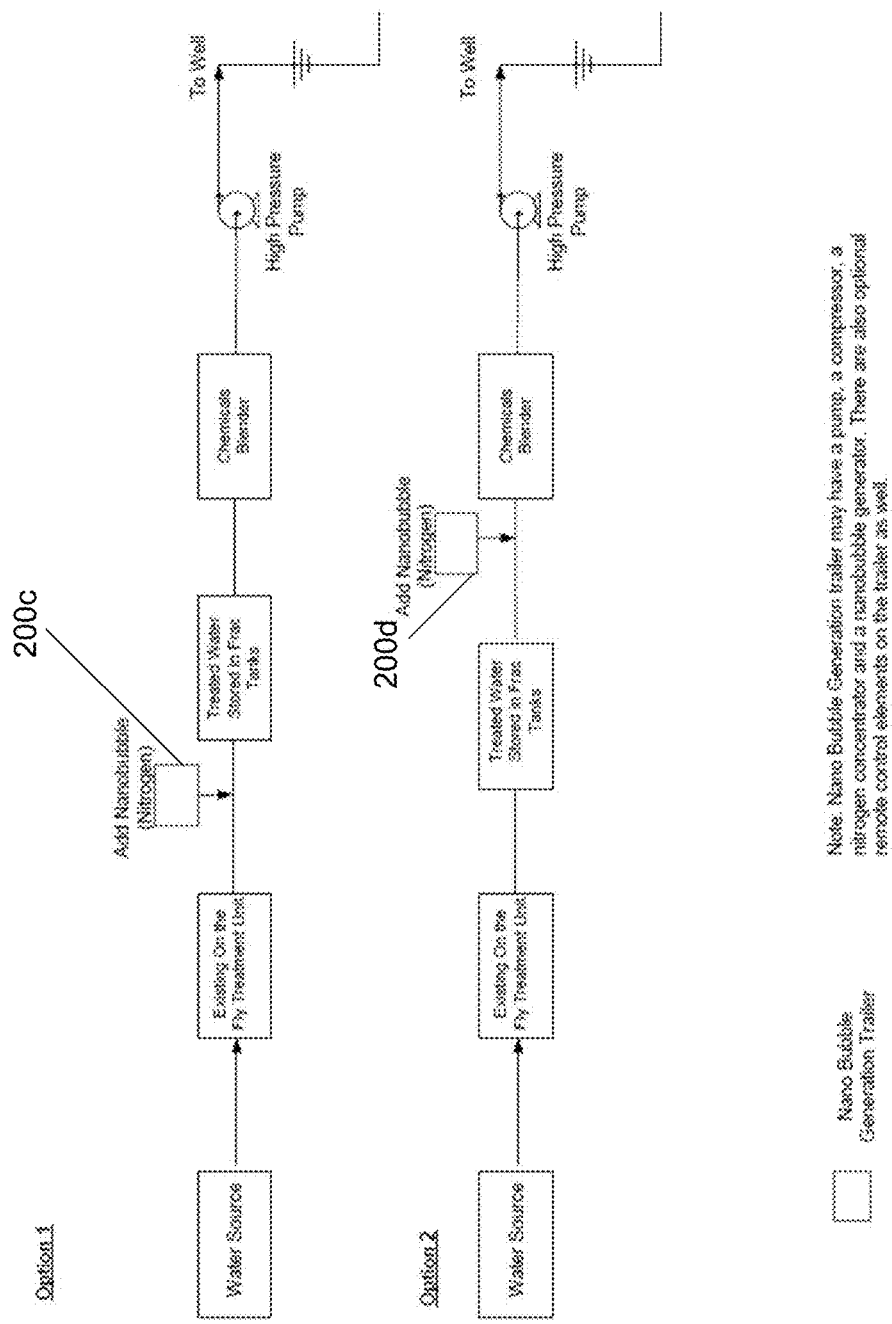

FIG. 16 shows two examples of optional placement for a nitrogen nano-bubble delivery system 200a, b at an oil/gas produced water (e.g., salt water) disposal facility. As seen, the system may be located just prior to 200a injection in the disposal well, or further upstream, such as prior to 200b treatment in a desander tank and gun barrel tanks (as described above). FIG. 17 shows similar options for fracking water treatment (e.g., typically prior to 200c or after 200d storage in the frac water tanks).

Figure 18:
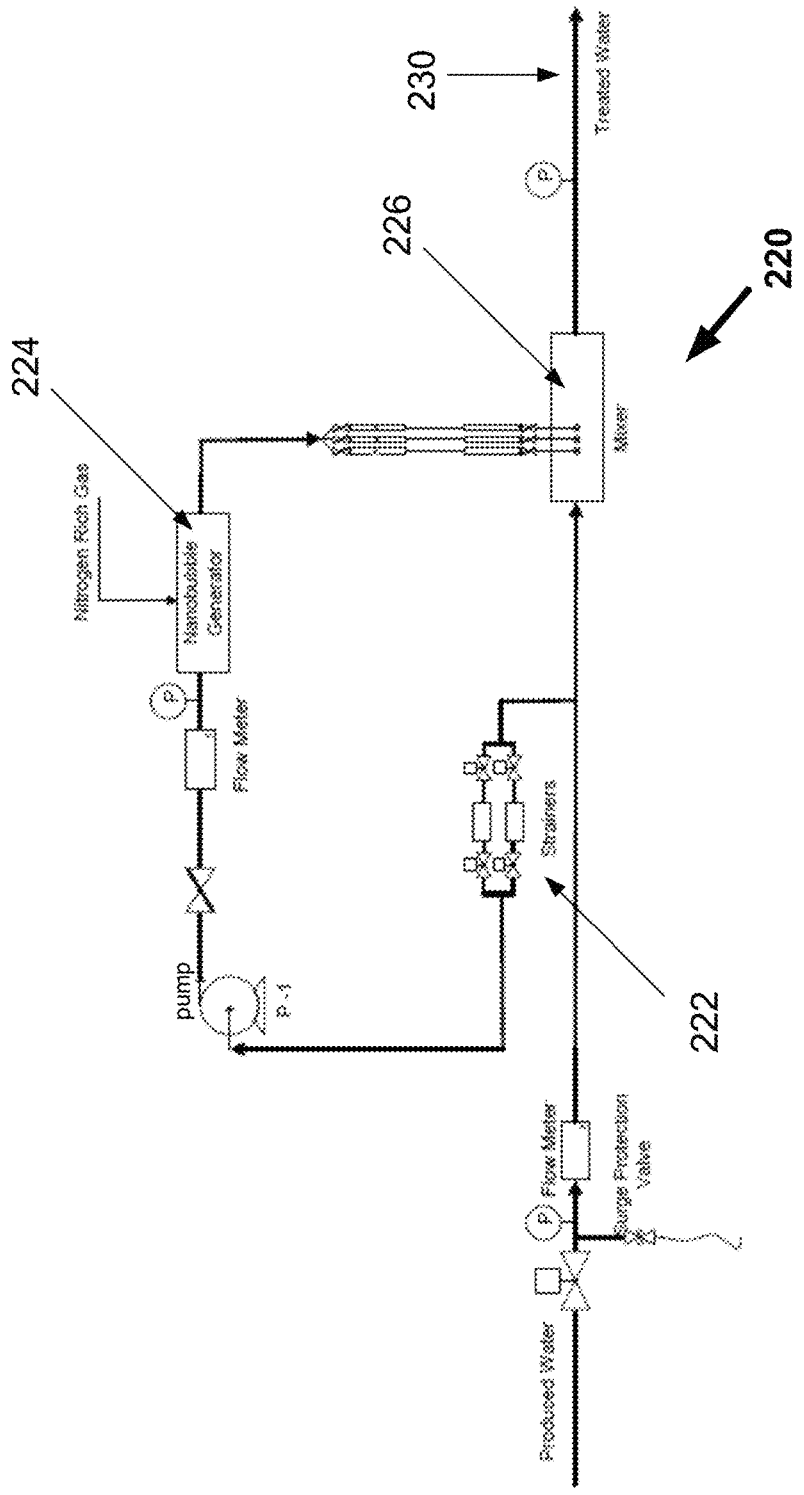

FIG. 18 shows a schematic of a nitrogen nano-bubble delivery manifold 220. A portion of produced water is drawn off, passed through strainers 222, and injected with nitrogen nano-bubbles 224, then mixed 226 back with the produced water. The treated water 230 then flows downstream for further treatment (if any) and injection. Flow meters are used to monitor fluid flow and control the introduction rates of nitrogen nano-bubbles.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A fluid treatment system configured to treat a fluid stream, comprising:
 a fluid injection or disposal well;
 one or more fluid treatment tanks, wherein the one or more fluid treatment tanks comprise at least one separator;
 one or more downstream pipes connecting the one or more water treatment tanks with the fluid injection or disposal well;
 upstream pipes in fluid connection with the one or more water treatment tanks; and
 an ozone injection system comprising an ozone generator and an injector configured to inject ozone gas or an ozone-oxygen mixture gas into the fluid stream prior to the fluid stream reaching the fluid injection or disposal well;
 wherein the ozone injection system produces oxygen-depleted inert reject gas in the process of producing oxygen and/or ozone;
 further wherein the oxygen-depleted inert reject gas is directed to the at least one separator as blanket gas.

2. The system of claim 1, wherein the ozone injection system injects the ozone gas or ozone-oxygen mixture gas upstream of the one or more fluid treatment tanks.

3. The system of claim 1, wherein the ozone injection system is a slipstream injection system configured to draw off a portion of the produced fluid stream for ozone gas or ozone-oxygen mixture gas injection with subsequent re-introduction of that portion of the produced fluid stream to the produced fluid stream.

4. The system of claim 1, wherein the ozone injection system injects a dose rate of ozone gas or ozone-oxygen mixture gas that varies over time.

5. The system of claim 4, wherein the dose rate varies dynamically as the quality of the fluid stream changes based upon continuous monitoring of the fluid stream quality.

6. The system of claim 1, wherein the ozone gas or an ozone-oxygen mixture gas is injected as nano-bubbles or micro-bubbles.

7. The system of claim 1, wherein the ozone injection system is contained in whole or in part in a moveable container or trailer.

8. The system of claim 1, wherein the fluid stream is produced water from oil or gas wells, and/or fracturing fluid for a hydrocarbon fracturing operation.

9. The system of claim 1, further comprising a nitrogen nano-bubble delivery system, configured to inject nitrogen or nitrogen-rich gas into the fluid stream.

10. The system of claim 1, wherein nitrogen or nitrogen-rich gas is injected downstream of the one or more fluid treatment tanks.

\* \* \* \* \*